United States Patent
Biondi et al.

(10) Patent No.: US 7,451,303 B2
(45) Date of Patent: Nov. 11, 2008

(54) METHOD AND SYSTEM FOR BOOTING REMOTE COMPUTING SYSTEMS FROM AN OPERATING SYSTEM IMAGE AND CREATING SYMBOLIC LINKS FOR DATA FILES

(75) Inventors: David Biondi, Orchard Lake, MI (US); Gary Ross, Ypsilanti, MI (US); Jonathon Robison, Fenton, MI (US)

(73) Assignee: Ford Motor Company, Dearborn, MI (US)

( * ) Notice: Subject to any disclaimer, the term of this patent is extended or adjusted under 35 U.S.C. 154(b) by 343 days.

(21) Appl. No.: 10/904,602

(22) Filed: Nov. 18, 2004

(65) Prior Publication Data

US 2006/0107030 A1 May 18, 2006

(51) Int. Cl.
G06F 9/00 (2006.01)

(52) U.S. Cl. .......................................... 713/2; 717/176

(58) Field of Classification Search .................. 713/2; 717/176
See application file for complete search history.

(56) References Cited

U.S. PATENT DOCUMENTS

| | | | | |
|---|---|---|---|---|
| 6,317,826 | B1 * | 11/2001 | McCall et al. | 713/1 |
| 7,069,428 | B2 * | 6/2006 | Miyamoto et al. | 713/1 |
| 7,159,106 | B2 * | 1/2007 | Meaney et al. | 713/2 |
| 7,233,985 | B2 * | 6/2007 | Hahn et al. | 709/222 |
| 2006/0048143 | A1 * | 3/2006 | Chao et al. | 717/177 |

OTHER PUBLICATIONS

Sun Microsystems, Inc., RFC 1094—NFS: Network File System Protocol Specification, Mar. 1989.*

* cited by examiner

*Primary Examiner*—Thomas Lee
*Assistant Examiner*—Albert Wang
(74) *Attorney, Agent, or Firm*—Raymond L. Coppiellie; Brooks Kushman P.C.

(57) ABSTRACT

Method and system for booting two or more computing systems from an operating system image. Image may be stored in persistent memory on a host computer in communication with remote computing systems. Remote systems boot in a read only fashion from operable system image. Remote computing systems may not include a hard drive, but store identifying information, function, services, file systems, etc. in volatile memory.

13 Claims, 2 Drawing Sheets

METHOD AND SYSTEM FOR BOOTING REMOTE COMPUTING SYSTEMS FROM AN OPERATING SYSTEM IMAGE AND CREATING SYMBOLIC LINKS FOR DATA FILES

BACKGROUND OF THE INVENTION

1. Field of the Invention

The present invention relates generally to computer boot procedures, and more specifically, a method and system for booting a plurality of servers from a single operating system image.

2. Background Art

Conventional network boot methods suffer from two fundamental drawbacks. First, they maintain a separate image for each remote system to boot from. Typically, the separate images are mirrors of a 'Master' image. The primary problem with this 'Master image' method is that unnecessary drive space is used—in many cases extensively—to maintain duplicate boot files. This unnecessary redundancy may result in increased memory/storage cost, increased architectural overhead, and an increased propensity of disk failure. In addition, complicated mirroring scripts and methods may be required to ensure uniformity across all copies of the Master image. Setup times for new systems are also typically longer and more complicated.

Second, conventional network boot methods are commonly used only for numerically-intensive or high-performance computing applications. In such arrangements, individual computers do not maintain their own identity. Instead, they act as a plurality 'CPU host' exploited for their processing ability. Thus, machines booted from those types of single image concepts are not able to maintain a separate identity and purpose from the other units.

One boot methodology is the OpenSSI clustering system from Hewlett Packard. This methodology uses a single drive image to boot multiple disparate machines having separate purposes. However, this methodology uses a clustered file arrangement where a separate system maintains the file system, all machines have full read/write access, and the separate system controls collisions and prevents multiple writes to the same file on the file system at the same time by the disparate machines. More information regarding the OpenSSI clustering system is available at www.openssi.org.

Another boot methodology is the Linux Terminal Server Project ("LTSP"). With LTSP, the entire file system is in memory and the initial image is provided during boot-up through BIOS using a "boot from network" option. Once booted, no hard drives are shared by any client terminals. More information regarding the LTSP is available at www.ltsp.org.

SUMMARY OF THE INVENTION

One advantageous result of the present invention is a decrease in the amount and complexity of necessary system maintenance, and an increase in the uniformity on operating system versions throughout an enterprise. In addition, embodiments of the present invention enable more efficient re-provisioning of systems (e.g. to switch or update operating systems, to create a useful system from a cold iron state, etc.).

Other benefits of the present invention may be derived from the reduction in raw storage capacity required for an enterprise, as well as reduced failure rates from unnecessary local hard drives.

In accordance with a preferred embodiment of the present invention, two or more remote computing systems (e.g. servers, etc.) may boot from a single OS image stored in persistent memory on a central host computer. Preferably, the remote computer systems boot in a read-only fashion from the OS image.

In one arrangement, the two or more remote computing systems do not include a hard drive, and include volatile memory for storing identifying information, function, services, file systems, symbolic links to remote information, etc.

DETAILED DESCRIPTION OF THE PREFERRED EMBODIMENT(S)

Figure 1:
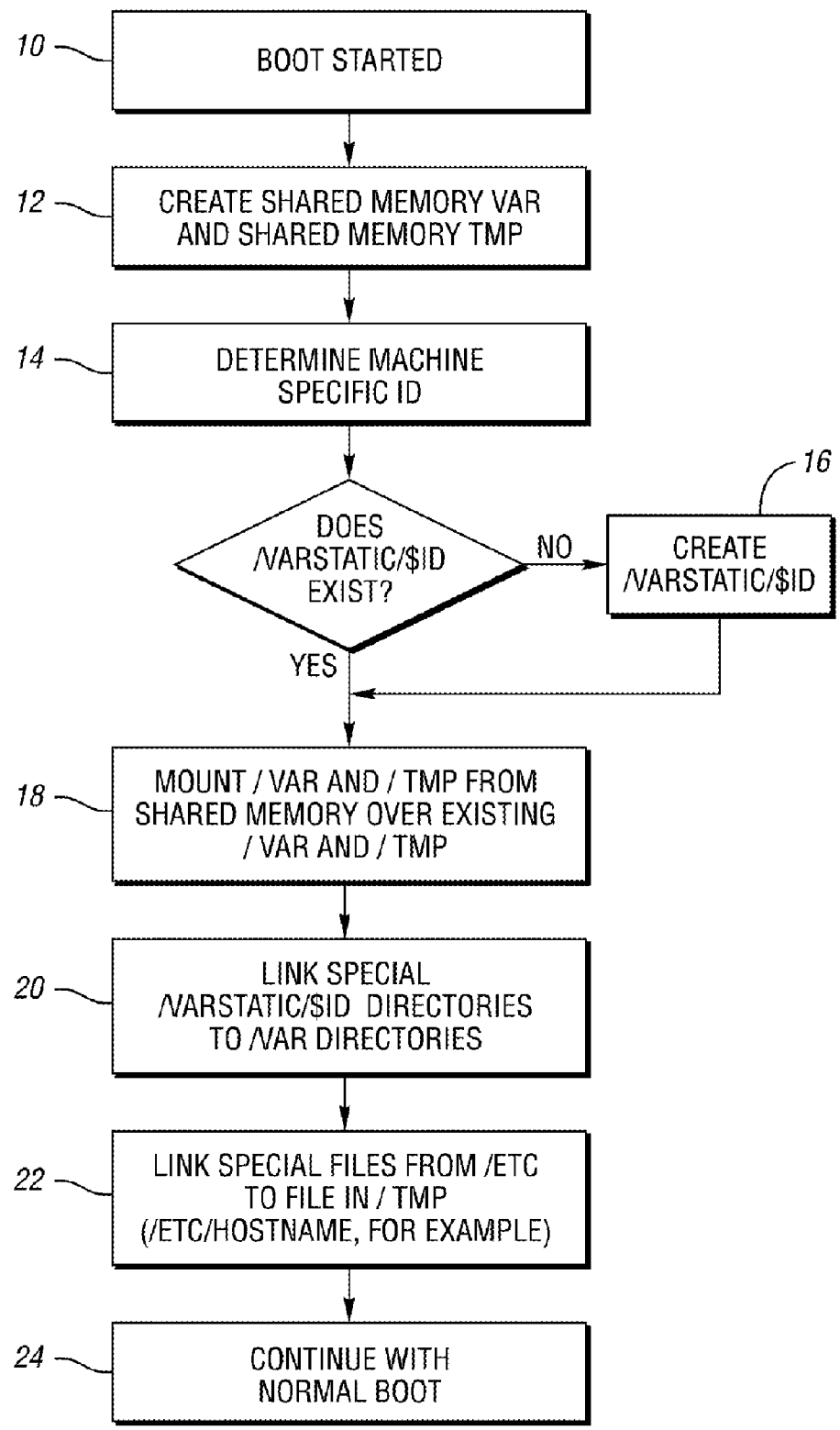
FIG. 1 is a block-flow diagram illustrating a preferred methodology for implementing aspects of the present invention.

One embodiment of the present invention is implemented on an operating system (e.g., Linux, Unix, etc.) and enables a plurality of distributed servers to boot themselves from a single operating system ("OS") image without having to duplicate the boot image. Using RAM drives or a Shared Memory File System (SHMFS), individual distributed computers maintain their own identity and purpose by holding identity and purpose information in volatile memory.

In accordance with a preferred embodiment of the present invention, two or more remote computing systems (e.g. servers, etc.) may boot from a single OS image stored in persistent memory on a central host computer. Preferably, the remote computer systems boot in a read-only fashion from the OS image.

In one arrangement, the two or more remote computing systems do not include a hard drive, and include volatile memory for storing identifying information, function, services, file systems, symbolic links to remote information, etc.

In accordance with a preferred embodiment of the present invention, the distributed computers may boot themselves in a generally conventional fashion. However, early in the boot stage, when the root file system is normally mounted read-only (in any boot process), memory-based storage and file systems therein may be created. These memory-based file systems may then be mounted in the root file system of the distributed computers.

Symbolic links (e.g. /etc/hostname, etc.) may be created for any data file which provides identifying information and cannot be moved into the memory based file system. Contents of the identifying files may be copied from a template or built by scripts during the boot process. Information that must survive a reboot and be accessible to all servers booting from the OS image may be maintained in a special directory on a shared OS file system. This directory may be symbolically linked to the appropriate location in the memory based file system during boot.

Once the operating system is loaded and functional, a plurality of scripts (e.g. sh, bash, perl, etc.) may be used to (i) identify the expected purpose of the machine, and (ii) start services from binaries located in the read only file system, or (iii) mount remote binaries via common methods. For example, a call to a perl script might be placed in rc.local (the last script executed during a boot process). This script might contact a remote database and act upon information stored therein.

Files which are kept open at all times while running, being written to, or read from may reside in the /var directory on Linux. These files are expected to live through a reboot. Other such files may reside in /tmp.

RAM Drive: /var

A number of files in /var are expected to live through a reboot. A /varstatic directory may be created during initial install/setup and might reside on its own partition. The contents of the initial /var can be copied to the partition (e.g. /var/lib directory, /var/adm, /var/X11R6, etc.).

A shared memory /var may be created using a RAM disk set up and accessed via /dev/shm (described below). Certain real subdirectories from varstatic (such as lib, etc.) may then be symbolically linked. This ensures that any alterations to the root file system by any server (e.g. upgrading an RPM, etc.) are accurately reflected in the server's live database(s). However, it is preferable to have the root file system mounted read-only.

For example, assume that we have a cluster of servers running from the same root directory. Server #1 is logged onto and an RPM update is performed. The RPM database, often located in /var/lib/rpm, will be updated. Since this is a symbolic link to a real directory, the changes to the RPM database will survive a reboot. Next, server #1's updated service is restarted. All other servers in the cluster are also updated, but they will not know it yet. The updated service will need to be restarted (perhaps with a kill -HUP) on all other servers in the cluster. Often, the needed restart is contained within the % POST section of the RPM package. RPM can be called with switches on each machine limiting the execution to only the needed % POST section.

The example RPM update procedure can be easily scripted to reduce the manual intervention needed to perform updates on the cluster.

According to one aspect of the present invention, a /var script may be created as follows:

Mkdir /dev/shm/var
Mount -t shm /dev/shm/var /var
/bin/chown 0:0 /var
/bin/chmod 755 /var
cd /var
/bin/mkdir-p-mode=755 run lib log spool/cron/crontabs
/bin/mkdir-p-mode=1777 tmp lock
ln -s /varstatic/lib /var/lib (repeated for the subs that must survive reboots)
Cat /var/log/messages >>/varstatic/log.$CPUID/messages (etc. for each logfile)
Rm -rf /var/log/*
ln -s /varstatic/log.$CPUID /var/log Preferably, the /var script also includes existence checks, etc. A Shared Memory /var may also be implemented in this fashion.

Shared Memory /tmp

The /tmp directory may be created in shared memory, growing and shrinking as necessary.

According to another aspect of the present invention, the following actions can be automated into the boot process:

mkdir /dev/shm/tmp
cp -Rp /tmp /dev/shm/tmp
mount -t shm /dev/shm/tmp /tmp
chmod 0777/tmp Loopback mounts of/var and/tmp According to another aspect of the present invention, files such as var.$CPUID may be created for mounting "loop" type file systems such as /var or /tmp. This aspect has the benefit of not using memory for system data.

/etc/mtab

The mount and unmount commands typically expect to update /etc/mtab. Because /proc/mounts largely duplicates this, /etc/mtab may be changed into a symbolic link to /proc/mounts. Startup scripts may also be edited to use the –n option for mounting and unmounting.

/dev/log

The syslogd daemon creates a log socket when it starts. Typically, this log socket is in /dev. According to another aspect of the present invention, /dev is changed to make /dev/log a symbolic link to /var/log. Additionally, the startup of syslog is changed to include the –p /var/log option.

ServerDrives

Notably, each server typically requires one drive to itself. This can be a local drive or, preferably, a drive from a SAN/NAS type of system. This drive is typically for SWAP—essentially a non-formatted raw partition, written to and read from as needed. Because the Shared Memory File System (shmfs) uses swap space to create the memory based drives, the swap partition/drive should be sized to accommodate the expected use of the shmfs or ram drive systems.

System Identity and Purpose

Because most syslog systems are capable of remote host logging, system logs can be written to a remote location. System logs may also be written to /varstatic/log. However, if all running systems attempt to write to the same log directory and file, file locking may become an issue. One possible method for resolving or preventing this issue is to create a symbolic link from /var/log (which resides on a shared memory file system) to /varstatic/log/[some identifier].

Because IP addresses can be dynamic, using the system IP address is not recommended for system identity. Also, the IP address, if dynamic, will not be known before the syslog system is started, in most cases. A recommended method for system identity is to use the CPU serial number, if reported by BIOS and accessible. Using the CPU Serial Number as an example, then /var/log would be a symbolic link to /varstatic/log/$SERIAL.

FIG. 1 is a block-flow diagram illustrating a preferred methodology for implementing aspects of the present invention.

The step represented at block 10 is normally referred to as the BIOS phase. The BIOS, which is burned on chips on the motherboard, has control of the process and sets up the system for access by an Operating System.

Once the BIOS phase is complete and the root file system is mounted read only, memory based file systems are created in either RAM disk form or shared memory form (/dev/shm, etc.) via standard methods, as represented at block 12.

Once the RAM disks and/or shared memory file systems are initialized, a machine specific identifier should be determined ($ID), as represented at block 14. Common methodology may be a CPU id as is often written to /proc on Linux machines, or perhaps network card MAC address, which is supposed to be unique.

If /varstatic/$ID does not exist yet in the shared file system, it will need to be created as represented in block 16. This may require temporarily remounting the root file system read/write. Files in this directory are those which are expected to survive a reboot. Thus, the choice of $ID source should be static and survive a reboot itself. Special directories from /var on the root file system, subh as lib, adm, X11R6, etc. should be linked via symbolic links to directories of the same name in /varstatic/$ID.

As represented at block 18, the /var and /tmp directories created in memory-based file system are mounted over /var and /tmp on the root file system. Per normal Unix and Linux practice, this will effectively "hide" the root file systems /var and /tmp subdirectories.

The special directories under /varstatic which were linked from the original /var, such as lib and adm, should now be linked to their correct locations under the newly mounted /var directory as represented by block 20. Thus, any system files which get written to the final /var will be writing to shared memory, with the exception of actions which would affect all systems sharing the root file system. Changes to those directories (lib, adm, etc.) will write to the real /var file system which must survive a reboot.

Special files from /etc, such as /etc/hostname, mtab, etc. will be moved to /tmp, and symbolic links created in /etc as represented in block 22. In the case of mtab, it may be deleted and a symbolic link may be created pointing to /proc/mount. This is a memory based file system specific to each machine and, for example, created as a normal part of Linux systems startup.

At block 24, system startup may resume with the rest of the startup scripts in /etc/init.d.

Figure 2:
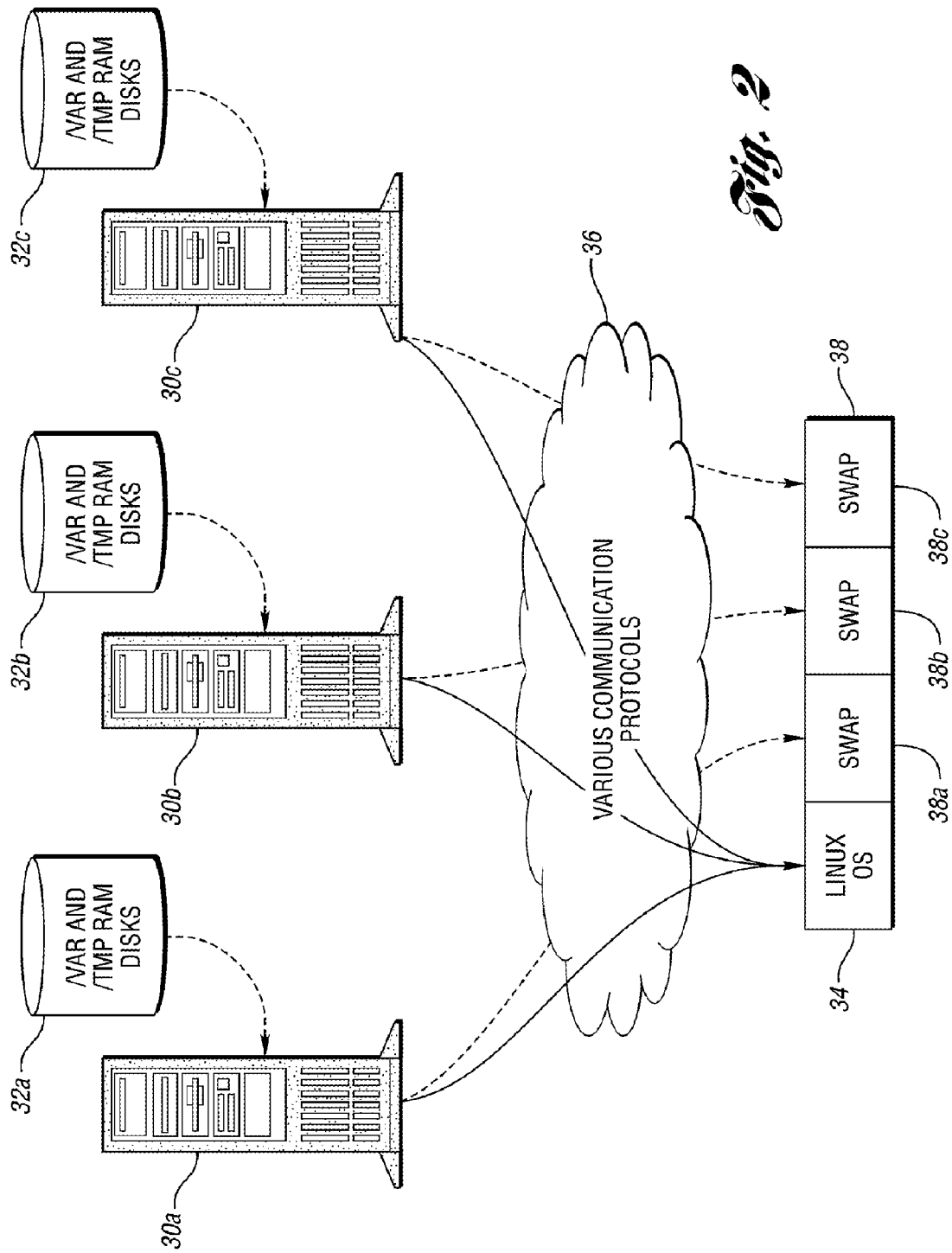
FIG. 2 is an environment diagram illustrating an example system architecture for implementing aspects of the present invention.

FIG. 2 is an environment diagram illustrating an example system architecture for implementing aspects of the present invention. Distributed computer systems 30a-30c include memory-based file systems 32a-32c. Distributed computer systems 30a-30c are in operable communication with shared root file system 34 (e.g., Linux OS, etc.) and system swap drives 38a-38c via one or more communication protocols 36.

While the best mode for carrying out the invention has been described in detail, those familiar with the art to which this invention relates will recognize various alternative designs and embodiments for practicing the invention as defined by the following claims.

What is claimed is:

1. A system for booting two or more remote computing systems, the system comprising:
   a host computer having persistent memory, a central processing unit, and being in operable communication with the two or more remote computing systems, the host computer being operably programmed and configured to make mountable an entire operating system image in a read/write fashion to the two or more remote computing systems, said image including one or more computer commands which allow the two or more remote computing systems to identify and differentiate themselves from one another, and which further create one or more memory based storage and file systems during the boot process, mount the memory based file systems in the root file system of the remote computing systems, and create symbolic links for any data file that provides identifying information and cannot be moved into the one or more memory based file systems.

2. The system of claim 1 wherein the two or more remote computing systems do not include a hard drive.

3. The system of claim 1, wherein the two or more remote computing systems are each operably programmed and configured to create memory-based identifications.

4. The system of claim 1, wherein the two or more remote computing systems are operably programmed and configured to determine their individual purpose or service based upon one or more host computer commands.

5. The system of claim 1, wherein the two or more remote computing systems include memory-based file systems.

6. The system of claim 1 wherein one of the two or more remote computing systems includes one or more links to one or more files stored on a file system separate from the one remote computing system.

7. The system of claim 1 wherein the two or more remote computing systems are identified by central processing unit serial number.

8. A system for booting two or more remote computing systems, the system comprising:
   a host computer having means to make mountable an entire operating system image in a read/write fashion to the two or more remote computing systems for booting the two or more remote computing systems, the two or more remote computing systems including means for identifying and differentiating themselves from one another, the two or more computers further including means for the creation of one or more memory-based storage and file systems during the boot process, and means for creating symbolic links for any data file which provides identifying information and cannot be moved into the one or more memory based file systems.

9. A method for booting two or more remote computing systems, the method comprising:
   upon boot, making mountable an entire operating system image on a host computer in a read/write fashion to the two or more remote computing systems, said image including one or more computer commands which allow the two or more remote computing systems to identify and differentiate themselves from one another;
   during boot, creating one or more memory-based storage and file systems in a root file system of at least one of remote computing systems;
   mounting at least one of the memory-based storage and file systems in the root file system of at least one of the remote computing systems; and
   creating symbolic links for any data file that provides identifying information and cannot be moved into the memory based file system.

10. The method of claim 9 additionally comprising creating a memory-based identification within each of the two or more remote computing systems for differentiating the two or more remote computing systems from one another.

11. The method of claim 9 additionally comprising specifying, at the host computer, a purpose of, or service to be provided by, the two or more remote computing systems.

12. The method of claim 9 additionally comprising creating one or more links at one of the remote computing systems to one or more files stored on a file system separate from the one remote computing system.

13. The method of claim 9 additionally comprising identifying the two or more remote computing systems by their respective central processing unit serial numbers.

* * * * *